US007248605B2

(12) United States Patent
Teidemann, Jr. et al.

(10) Patent No.: US 7,248,605 B2
(45) Date of Patent: *Jul. 24, 2007

(54) METHOD AND APPARATUS FOR HIGH RATE CHANNEL ACCESS CONTROL

(75) Inventors: Edward G. Teidemann, Jr., Concord, MA (US); Yu-Cheun Jou, San Diego, CA (US); Yu-Chuan Lin, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 559 days.

This patent is subject to a terminal disclaimer.

(21) Appl. No.: 10/388,065

(22) Filed: Mar. 12, 2003

(65) Prior Publication Data

US 2003/0235210 A1    Dec. 25, 2003

Related U.S. Application Data

(63) Continuation of application No. 09/293,564, filed on Apr. 15, 1999, now Pat. No. 6,567,420.

(51) Int. Cl.
*H04J 3/16* (2006.01)
(52) U.S. Cl. ..................... 370/468; 370/230
(58) Field of Classification Search ................ 370/468, 370/230, 231, 390, 432
See application file for complete search history.

(56) References Cited

U.S. PATENT DOCUMENTS

| 4,409,592 A | 10/1983 | Hunt |
| 4,701,905 A | 10/1987 | Un et al. |
| 4,811,338 A | 3/1989 | Haruyama et al. |
| 4,864,589 A | 9/1989 | Endo |

(Continued)

FOREIGN PATENT DOCUMENTS

EP    0765096 A2    3/1997

(Continued)

OTHER PUBLICATIONS

Dill J C et al., "Adaptive Algorithms For Improving The Throughput Of CDMA Packet Radio Networks". Infocom '89. Proceedings Of The Eighth Annual Joint Conference Of The IEEE Computer And Communications Societies. IEEE Ottawa, Ont., Canada Apr. 23-27, 1989, Washington, DC, USA, IEEE Comput. Soc. PR, US, Apr. 23, 1989, pp. 1078-1083, XP010015469.

(Continued)

*Primary Examiner*—Brian Nguyen
(74) *Attorney, Agent, or Firm*—Thomas Rouse; Charles D. Brown; Won Tae C. Kim

(57) ABSTRACT

Access to a variable rate multiple access system is controlled based upon a current loading. The current loading level is used to determine a transmission rate set point. The transmission rate set point may include a maximum transmission rate and a transmission probability. The transmission rate set point is passed to the remote unit which may access the system. A remote unit with data to send determines a desired transmission data rate. If the desire transmission data rate is equal to or greater than the maximum transmission data rate, the remote unit transmits at the maximum transmission data rate with a probability equal to the transmission probability.

4 Claims, 4 Drawing Sheets

U.S. PATENT DOCUMENTS

| | | | |
|---|---|---|---|
| 5,144,668 A | | 9/1992 | Malek et al. |
| 5,155,727 A | | 10/1992 | Borup et al. |
| 5,544,196 A | | 8/1996 | Tiedemann et al. |
| 5,754,541 A | | 5/1998 | Glisic et al. |
| 6,078,568 A | * | 6/2000 | Wright et al. ............... 370/312 |
| 6,310,872 B1 | * | 10/2001 | Almgren et al. ............ 370/349 |
| 6,393,030 B1 | * | 5/2002 | Kim et al. .................. 370/441 |
| 6,661,777 B1 | * | 12/2003 | Blanc et al. ................. 370/252 |

FOREIGN PATENT DOCUMENTS

| | | |
|---|---|---|
| EP | 0804006 A2 | 10/1997 |
| EP | 0862299 A2 | 9/1998 |
| WO | 96/37081 | 11/1996 |
| WO | 97/35410 | 9/1997 |
| WO | 99/59278 | 11/1999 |

OTHER PUBLICATIONS

A. Koike et al., "On End System Behavior for Explicit Forward Congestion Indication of ABR Service and its Performance," IEICE Transactions on Communication, Institute of Electronics Information and Comm. Eng. Tokyo, JP. vol. E79B, No. 4, Apr. 1, 1996 (pp. 605-610).

* cited by examiner

METHOD AND APPARATUS FOR HIGH RATE CHANNEL ACCESS CONTROL

This application is a continuation of U.S. patent application Ser. No. 09/293,564, filed Apr. 15, 1999, now U.S. Pat. No. 6,567,420 issued on May 20, 2003, entiled "Method and Apparatus for High Rate Channel Access Control."

BACKGROUND OF THE INVENTION

I. Field of the Invention

The invention relates to communication systems. More particularly, the invention relates to resource allocation in a multiple access system.

II. Description of the Related Art

FIG. 1 is an exemplary embodiment of a terrestrial wireless communication system 10. FIG. 1 shows three remote units 12, 13, and 15 and two base stations 14. In reality, typical wireless communication systems may have many more remote units and base stations. In FIG. 1, the remote unit 12 is shown as a mobile telephone unit installed in a car. FIG. 1 also shows the fixed location remote unit 15 in a wireless local loop system and the portable computer remote unit 13 in a standard cellular system. In the most general embodiment, the remote units may be any type of communication unit. For example, the remote units may be hand-held personal communication system (PCS) units, portable data units such as a personal data assistant, or fixed location data units such as meter reading equipment. FIG. 1 shows a forward link signal 18 from the base stations 14 to the remote units 12, 13 and 15 and reverse link signal 19 from the remote units 12, 13 and 15 to the base stations 14.

In a typical wireless communication system, such as that illustrated in FIG. 1, some base stations have multiple sectors. A multi-sectored base station comprises multiple independent transmit and receive antennas as well as some independent processing circuitry. The principles discussed herein apply equally to each sector of a multi-sectored base station and to a single sectored independent base station. For the remainder of this description, therefore, the term "base station" can be assumed to refer to either a sector of a multi-sectored base station, a plurality of sectors associated with a common base station or a single sectored base station.

In a CDMA system, remote units use a common frequency bandwidth for communication with all base stations in the system. Use of a common frequency bandwidth adds flexibility and provides many advantages to the system. For example, use of a common frequency bandwidth enables a remote unit to simultaneously receive communication signals from more than one base station, as well as transmit a single signal for reception by more than one base station. The remote unit discriminates the simultaneously received signals from the various base stations through the use of the spread spectrum CDMA waveform properties. Likewise, the base station can discriminate and separately receive signals from a plurality of remote units.

In a wireless system, maximizing the capacity of the system in terms of the number of simultaneous calls that can be handled is extremely important. System capacity in a spread spectrum system is increased if the power received at the base station from each remote unit is controlled such that each signal arrives at the base station receiver at the minimum power level required to obtain a desired signal quality level. If a signal transmitted by a remote unit arrives at the base station receiver at a power level that is too low, the signal quality may fall below an acceptable level. If, on the other hand, the remote unit signal arrives at a power level that is too high, communication with this particular remote unit is acceptable, but the high power signal acts as interference to other remote units. This excessive interference may adversely affect communications with other remote units. Thus, in general, a remote unit located near the base station transmits a relatively low signal power while a remote unit located at the edge of the coverage area transmits a relatively large signal power.

In more advanced systems, in addition to controlling the power level at which the remote unit transmits on the reverse link, the data rate at which the remote unit transmits on the reverse link is also controlled. A remote unit located on the edge of a coverage area may reduce the data rate at which it transmits in order to increase the signal quality of the signal as received at the base station. By reducing the data rate, the time devoted to each bit may be increased, thus, increasing the energy devoted to each bit and increasing the performance of the link.

In addition to link performance, the use of variable data rates can also provide other benefits to the system. For example, a remote unit may generate a stream of data which is being produced at a data rate significantly below a maximum data rate. The remote unit may chose to transmit the data at a rate lower than the maximum rate in order to conserve remote unit power and spectral resources. In addition some remote units may be categorized according to the level of service which they provide. For example, a preferred client remote unit may provide data transfer up to a maximum rate while an economy level remote unit may provide data transfer at one-eighth, one-quarter or one-half of the maximum rate. A remote unit which transmits at less than the maximum rate may transmit at a lower power level or it may transmit only a portion of the time. For example a remote unit transmitting at one-quarter of the maximum rate may transmit its signal at one-quarter of the power which would be necessary to transmit a full-rate signal. Alternatively, a remote unit which is transmitting at one-quarter of a maximum rate may transmit with a duty cycle of approximately one over four. In either case, a remote unit which transmits at less than the full rate generates less interference and consumes less system resources than a remote unit transmitting at full rate, thereby, freeing system resources for use by other remote units.

If a minimum acceptable signal quality is specified, an upper bound on the number of simultaneous users which can communicate through a base station can be calculated at a given level of interference. This upper bound is commonly referred to as pole capacity. The ratio of actual users to pole capacity is defined as the loading of the system. As the number of actual users approaches the pole capacity, loading approaches unity. A loading close to unity implies potentially unstable behavior of the system. Unstable behavior can lead to degraded performance in terms of error rate performance, failed hand-offs, and dropped connections. In addition, as loading approaches unity, the size of the coverage area of the base station shrinks such that users on the outer edge of the coverage area may no longer be able to transmit sufficient power to communicate with the base station at an acceptable signal quality even at the lowest available data rate.

For these reasons, it is advantageous to limit the usage of a system such that loading does not exceed a specified percentage of the pole capacity. One way to limit the loading of the system is to deny access to the system once the loading of the system has reached a predetermined level. For example, if the loading increases above 70% of the pole capacity, it is advantageous to deny requests for additional connection originations and to refrain from accepting handoff of existing connections. In a system in which the remote units are capable of transmitting at multiple data rates, the loading of the system can also be controlled by controlling the data rate at which the remote units transmit. For a given level of loading, by reducing the data rate at which each remote unit may transmit, the total number of remote units able to access the system may be increased.

In a typical digital data multiple access system, a remote unit establishes a communication session with the base station. The session remains active until power is removed from the remote unit or until the remote unit requests a disconnection. Once a session has been established, a remote unit transmits bursts of data. For example, if a remote unit user connects to an internet via a wireless connection and his notebook computer, he establishes a session when he logs into the network. If the remote unit user generates an e-mail message, the remote unit generates a burst of data when it transfers the e-mail message. The burst of data may contain one or more packets of data. The packets of data typically comprise many wireless link frames of data.

In a system in which the data rate of the remote unit is controlled by the base station, before the remote unit transmits a burst of data, it sends an access request message to the base station. Typically, the access request message specifies the desired transmission data rate. In response the base station may give permission for the remote unit to transmit at the desired data rate, may give the remote unit permission to transmit at a lower data rate, or may deny access to the system. The use of such a system has several drawbacks. For example, the use of an access request message consumes the precious reverse link resources. In addition, the transmission of data over the reverse link is delayed while the remote unit and base station negotiate a data rate. In addition, the algorithm which must be used by the base station to respond to the access request messages from a plurality of remote units is complicated and consumes considerable base station resources.

For these reasons, there has been a long felt need in the industry for a method and apparatus for controlling access to a multiple access system employing a variable data rate transmission scheme.

SUMMARY OF THE INVENTION

A base station is used to control the reverse link transmission rates for remote units within the corresponding coverage area. The base station monitors the reverse link loading and dynamically adjusts the transmission rate set point. The transmission rate set point may be defined in terms of a maximum transmission rate and a transmission probability. The maximum transmission rate defines the maximum reverse link data rate available to the remote units. The transmission probability is used to control the probability that a remote unit transmits at the given maximum transmission rate. The base station may broadcast the transmission rate set point to the remote units. The remote units may transmit at a rate lower than the maximum transmission rate at any time. In this way, the loading of the system is controlled in a fast and stable manner which efficiently utilizes available system resources.

BRIEF DESCRIPTION OF THE DRAWINGS

The features, objectives, and advantages of the invention will become more apparent from the detailed description set forth below when taken in conjunction with the drawings.

DETAILED DESCRIPTION OF THE INVENTION

Figure 1:
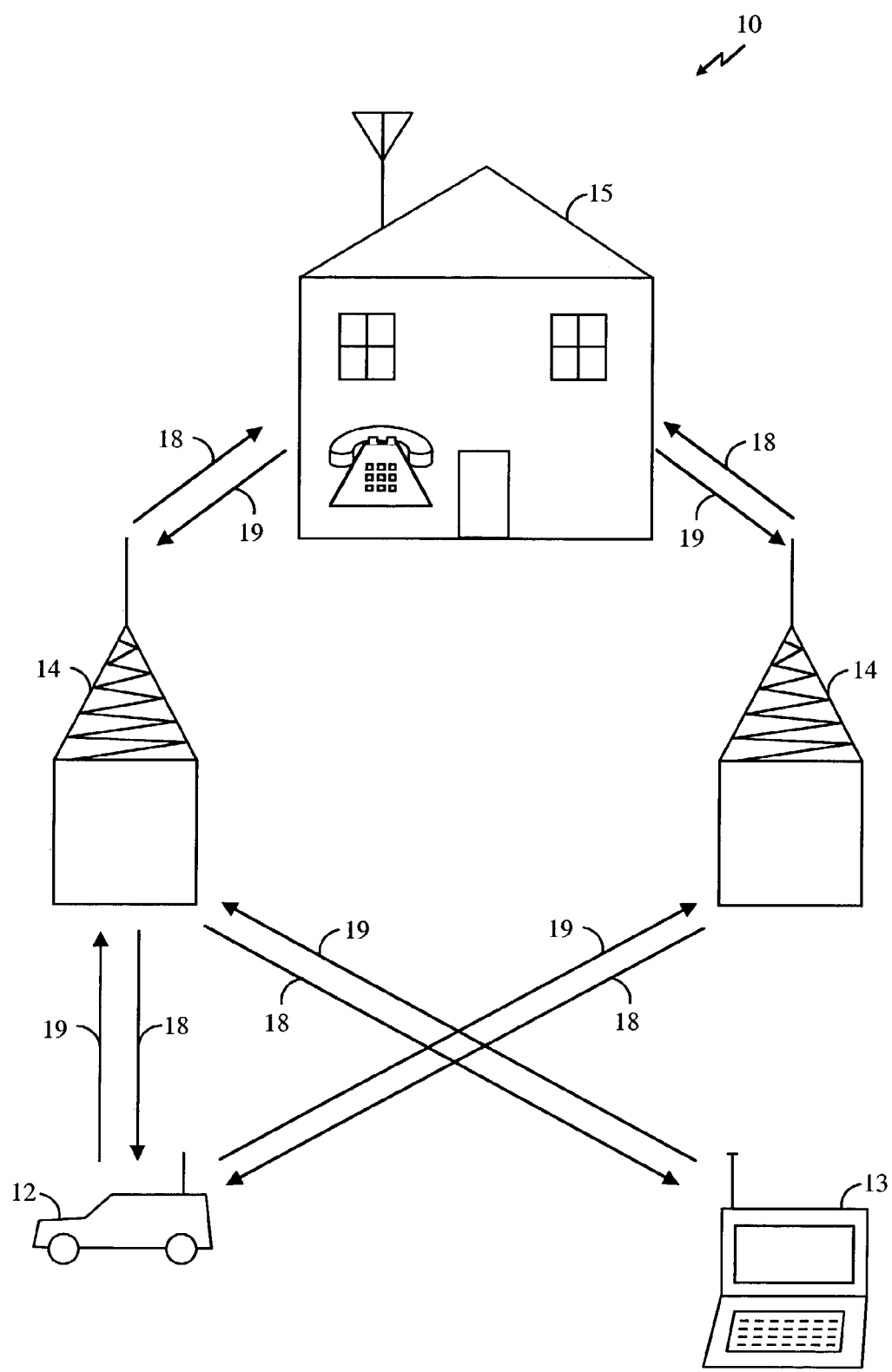
FIG. 1 is an exemplary embodiment of a terrestrial wireless communication system.

In a multiple access system which has finite resources, a means of controlling the reverse link loading is necessary in order to avoid unstable system behavior. In a system in which the remote units are capable of transmitting data at a plurality of data rates, the reverse link loading may be controlled by regulating the data rate at which the remote units transmit. For example, in a system in which the level of external and mutual interference allow thirty remote units to access the system simultaneously at a given data rate, the same system may allow sixty remote units to access the system simultaneously if each of the remote units transmits at one-half of the given data rate. If a portion of the remote units transmits at one-half of the given data rate, the system may accommodate a number of simultaneous users between thirty and sixty. Under actual operating conditions, the capacity of a system is soft limiting meaning that each remote unit which is added to the system reduces the signal quality at which each of the other system users operates. The capacity is also a function of time in that interference from sources other than remote units varies over time and may contribute significantly to the loading of the system. Because it is advantageous to avoid a catastrophic failure which may result if the loading exceeds the maximum capacity, typically system operators limit the loading to between 60% and 75% of the anticipated capacity limit.

In order to limit the loading on the reverse link to a specified level, it is necessary to measure the reverse link loading. Reverse link loading of a base station is not only a function of the remote units that are operating within the coverage area of the base station. Reverse link loading is also a function of interference from other sources. The front end noise of the base station itself is a significant source of interference. In addition, other remote units operating on same frequency within the coverage area of nearby base stations contribute significant interference. Co-pending U.S. patent application Ser. No. 09/181,345 entitled "METHOD AND APPARATUS FOR REVERSE LINK OVERLOAD DETECTION", filed on Oct. 28, 1998, now U.S. Pat. No. 6,603,745 issued on Aug. 05, 2003, assigned to the assignee hereof and incorporated in its entirety herein, discloses a means and method of determining loading. A myriad of methods of determining loading may be used in conjunction with the invention.

According to the present invention, a base station uses a measure of loading on the reverse link in order to control the data rate at which a plurality of remote units transmit. In a typical multiple access system, the base station routinely transmits an overhead channel. The overhead channel carries information which is received by multiple remote units. The overhead channel carries information concerning system operation such as the identity of nearby base stations, the availability of certain services and the identity of the system operator. According to one embodiment of the present invention, in addition to the standard overhead information, the base station also transmits a transmission rate set point. The remote unit retrieves the set point information from the overhead channel and uses it to determine the rate at which it transmits.

In one embodiment, the transmission rate set point is defined in terms of a maximum transmission data rate as well as a transmission probability. The maximum transmission rate defines the maximum reverse link data rate for use by the remote units. The transmission probability is used to control the probability that a remote unit transmits at the given maximum transmission rate. The remote units may transmit at a rate lower than the maximum transmission rate at any time.

In order to facilitate efficient use of system resources, it is advantageous to allow the system to operate as close as possible to the capacity limit in view of the corresponding probability of unstable system behavior. According to the invention, the transmission rate set point is slowly increased as long as the loading of the system remains below the maximum allowable loading. If the actual loading of the system exceeds the maximum allowable loading, the transmission rate set point is decreased.

In one embodiment, so long as the loading of the system remains the below the maximum allowable loading, the transmission probability is slowly increased. When the transmission probability exceeds unity, the maximum transmission data rate is increased to the next higher available level and the transmission probability is reduced. In this way the transmission rate set point slowly increases until the loading reaches the maximum allowable loading. If the available system resources are sufficient to support the needs of all the remote units, the transmission rate set point increases until the transmission probability is equal to 1 and the maximum transmission rate is equal to the highest data rate. If the available system resources are not sufficient to allow each remote unit to transmit at its desired rate, as the transmission rate set point slowly increases, the loading eventually exceeds the maximum allowable loading. Once the loading exceeds the maximum allowable loading, the transmission rate set point is reduced. If the demand remains constant, the system reaches an equilibrium where the transmission rate set point is approximately equal to the maximum allowable transmission rate set point. For example, if the demand on the system is high, the maximum transmission rate may be set to one-half of full rate and the transmission probability may be less than unity.

In the preferred embodiment, the lowest possible transmission rate set point is defined as a maximum transmission rate equal to the lowest data rate and a transmission probability equal to 1. Therefore, even under maximum loading conditions, each remote unit with an established connection is enabled to transmit at the lowest rate with a probability of unity. In order to maintain system stability, it may be necessary to deny access to the system to additional remote units if the loading exceeds the maximum allowable loading when the transmission rate set point is at a minimum.

One benefit of operation according to the present invention is that the transmission control process at the base station relatively easy to implement. Only a single input to the process is used to determine the transmission rate set point. In one embodiment, the transmission rate set point consisting of only two numbers is the only output. In comparison with the prior art method of individually responding to sporadic access requests messages from the various remote units each time the remote unit has data to transmit, the operation of the invention is streamlined. Operation is not dependent upon input concerning such factors as the number of current users or the anticipated usage of the users or the quantity of remote units within a certain class. In addition, the operation does not require large amounts of data storage to store information concerning recently granted admissions to remote units.

Figure 2:
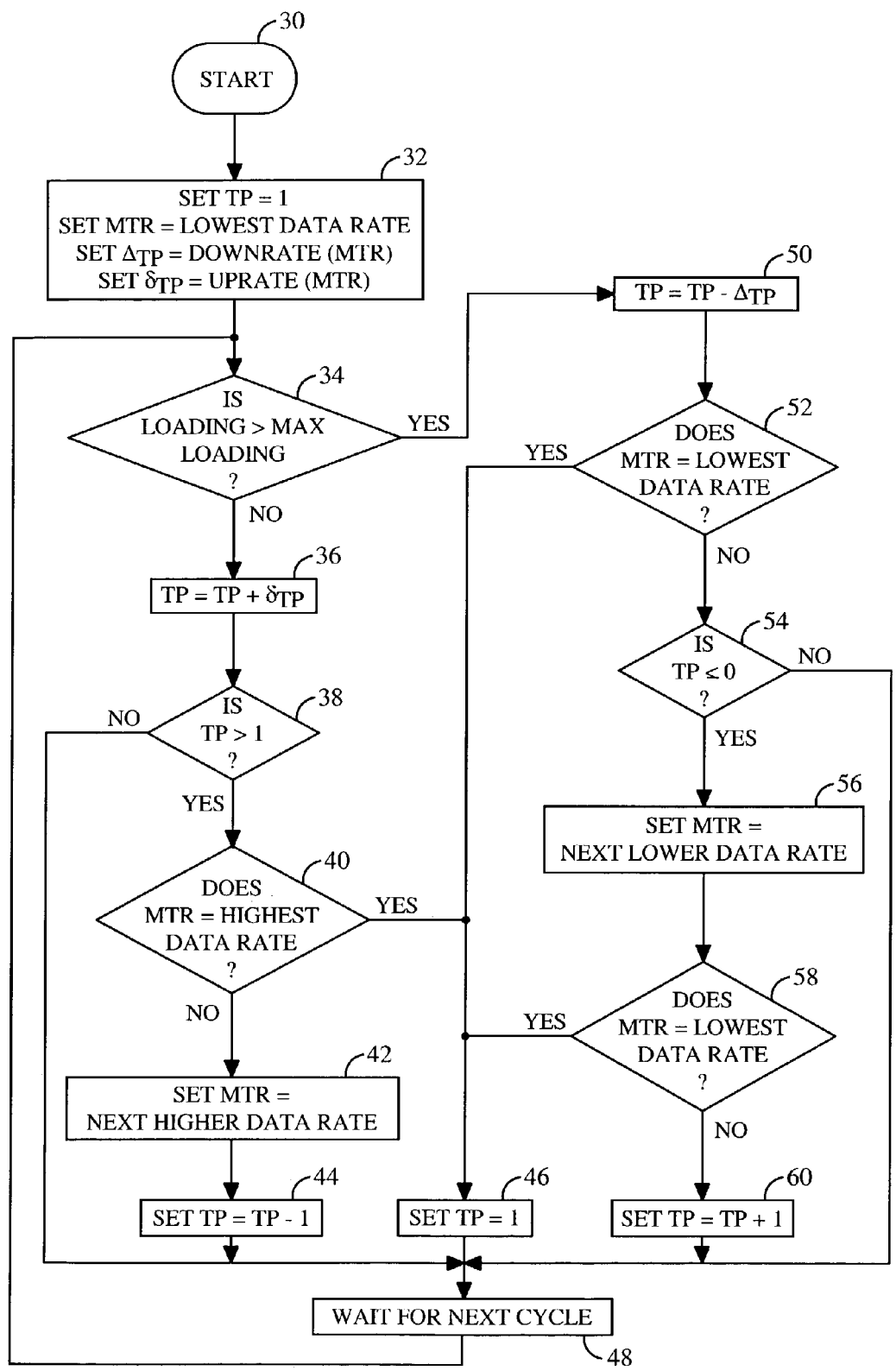
FIG. 2 is a flow chart illustrating base station operation.

FIG. 2 is a flow chart illustrating base station operation. Operation begins at start block 30. In block 32, the variables used in the process are set to initial values. The transmission probability is set to 1 and the maximum transmission rate is set to the lowest data rate in order to set the transmission rate set point to its minimum value. In an exemplary system, the lowest data rate may be one-eighth of the full rate.

In block 32 the down-rate "$\Delta_{TP}$" and the up-rate "$\delta_{TP}$" are set to a nominal level. In an exemplary system, the value of the down-rate and the up-rate depend upon the current maximum transmission rate. For example, in a system in which data may be transmitted at one-eighth of a full rate, one-quarter of a full rate, one-half of a full rate, and a full rate, the value of $\Delta_{TP}$ may be one-half, one-quarter, one-eighth and one-sixteenth, respectively. In a typical environment, the value of $\delta_{TP}$ is less than the value of $\Delta_{TP}$. For example, in this system just described, the value of $\delta_{TP}$ may be one-sixteenth of the value of $\Delta_{TP}$ for each data rate.

Block 34 determines whether loading has exceeded the maximum allowable loading. If not, flow continues to block 36 where the transmission probability is increased by $\delta_{TP}$. Flow continues to block 38 which determines whether the transmission probability has exceeded 1. In this case, because the transmission probability was set to 1 in block 32 and increased by the value of $\delta_{TP}$ in block 36, the transmission probability has exceeded 1 and flow continues in block 40. Block 40 determines whether the maximum transmission rate is equal to the highest data rate. In this example, a maximum transmission data rate was set to the lowest rate in block 32 and, therefore, the maximum transmission data rate is not equal to the highest data rate and flow continues in block 42. In block 42 the maximum transmission rate is set to the next higher data rate. For example, in a system with four data rates, the maximum transmission data rate may be set to one-quarter of the full rate. In block 44, the value of the transmission probability is reduced by 1. Flow continues to block 48 where the process may be paused in anticipation of the next cycle.

Returning again to block 38, if the transmission probability has not exceeded 1, flow continues directly to block 48. Returning to block 40, if the maximum transmission rate is already equal to the highest data rate, the transmission rate set point is at its maximum level and flow continues in block 46. In block 46, the transmission probability is set to 1. Flow then continues to block 48.

Returning again to block 34, if the loading has exceeded the maximum allowable loading, flow continues in block 50. In block 50, the transmission probability is reduced by $\Delta_{TP}$ and flow continues in block 52. Block 52 determines whether the maximum transmission rate is equal to the lowest data rate. If the maximum transmission rate is equal to the lowest data rate, flow continues in block 46 where the transmission probability is set to 1. If the maximum transmission rate is not equal to the lowest data rate, flow continues to block 54. Block 54 determines whether the transmission probability is less than or equal to zero. If so, the maximum transmission rate is set to the next lower data rate in block 56 and flow continues in block 58. Block 58 determines whether the maximum transmission data rate is equal to the lowest data rate. If so, flow continues in block 46 where the transmission probability is set to 1. If not, flow continues to block 60 where the transmission probability is increased by 1. In either case, flow continues to block 48.

The operation within the remote unit is also simplified in comparison to the generation of an access request message before each transmission. According to the invention, the remote unit chooses a desired transmission rate. A myriad of criteria and methods for determining the desired data rate may be used in conjunction with the present invention. For example, the determination of the desired data rate may take into consideration the amount of data queued for transmission, the available transmission power which can be dedicated to higher data rates, the class of service requested by the user, or the level of urgency associated with the transmission. Additional information concerning the selection of a desired data rate may be found in U.S. Pat. No. 5,914,950 entitled "METHOD AND APPARATUS FOR REVERSE LINK DATA RATE SCHEDULING" issued Jun. 28, 1999, assigned to the assignee hereof. The remote unit transmits at the desired data rate so long as the desired data rate is less than the maximum transmission rate received from the base station. If the desired rate is equal to or exceeds the maximum transmission rate, the remote unit transmits at the maximum transmission rate with a probability equal to the transmission probability. If the remote unit does not transmit at the maximum transmission rate, it transmits instead at the next lower rate. In this way, in the general case, the ratio of the number of users transmitting at the maximum transmission rate compared to the number of remote units of the same class which desire to transmit at the maximum transmission rate or higher is equal to the transmission probability on average. In this way, system resources are used efficiently and fairly.

If a remote unit is in soft hand-off with one or more base stations, it may receive a transmission rate set point from more than one base station. The remote unit may use the lowest transmission rate set point received from any one of the base stations with which it is in soft handoff. The lowest rate set point may be determined by selecting the transmission rate set point which specifies the lowest maximum transmission rate or, if the maximum transmission rates are equal, the transmission rate set point with the lowest transmission probability. Alternatively, the remote unit may use the highest rate set point or it may average or otherwise combine the two transmission rate set points.

Figure 3:
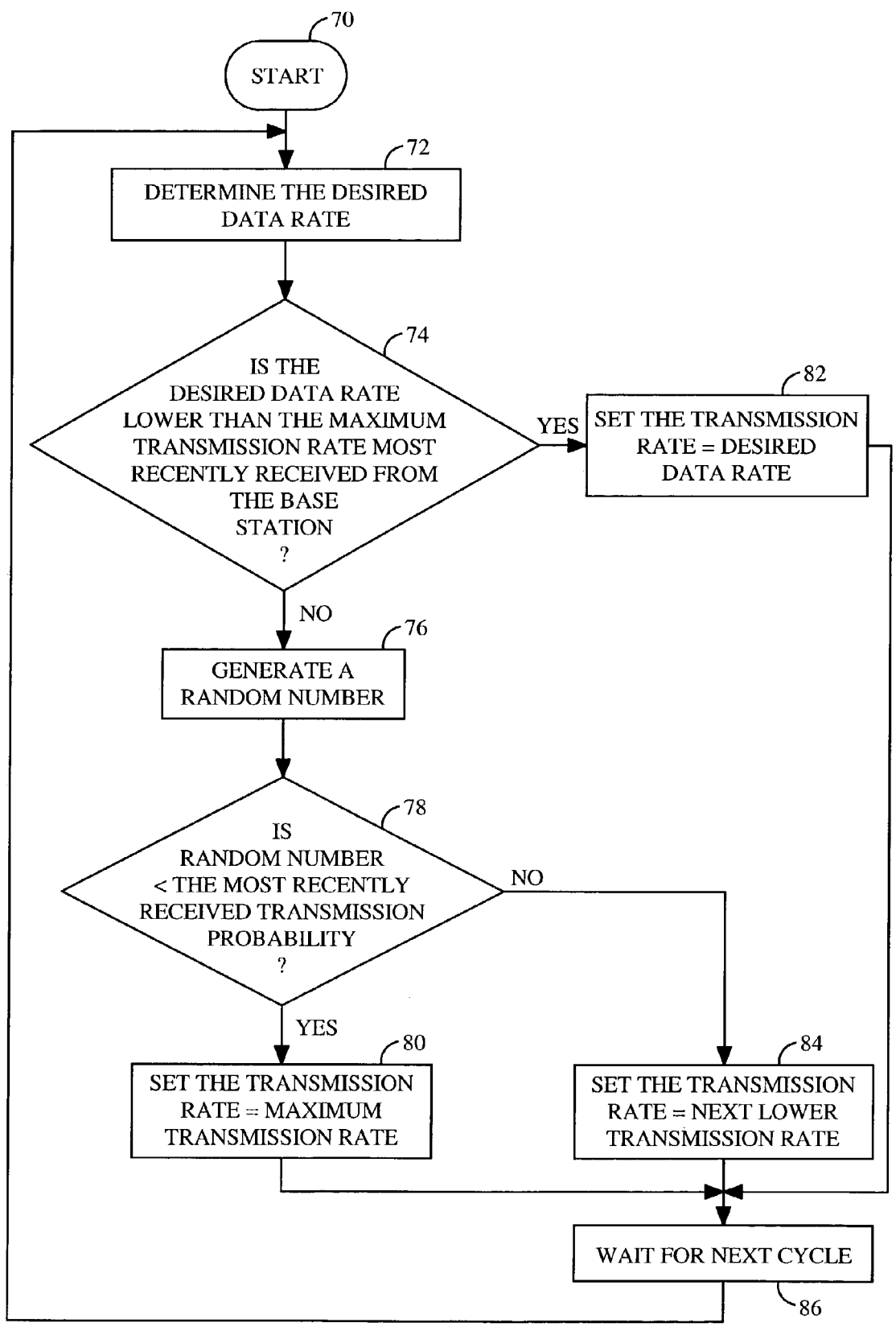
FIG. 3 is a flow chart showing exemplary remote unit operation.

FIG. 3 is a flow chart showing exemplary remote unit operation. Flow begins in start block 70. In block 72, the remote unit determines its desired data rate. Once the desired data rate is determined, flow continues in block 74. Block 74 determines if the desired data rate is lower than the most recently received maximum transmission data rate. As noted above, the remote unit may monitor an overhead channel for the current value of the transmission rate set point. If the desired data rate is lower than the maximum transmission rate, the remote unit may set the transmission data rate to the desired data rate in block 82. In block 86, the system uses the just-determined transmission rate until a new value is determined. If the desired data rate exceeds or is equal to the maximum transmission rate, flow continues from block 74 to block 76. In block 76, the remote unit generates a random number. In the preferred embodiment, the random number takes on a value between 0.00 and 0.99. Block 78 determines whether the random number is less than the most recently received transmission probability. If so, the transmission rate is set to the maximum transmission rate in block 80. If not, the transmission rate is set to the next lower transmission rate down from the maximum transmission rate in block 84. In either case, flow continues to block 86.

According to the invention, the transmission of data from the remote unit occurs at the transmission rate set in block 80, 82 or 84. In this way, reverse link capacity is not consumed with the transmission of access request messages. In addition the transmission of reverse link data is not delayed by the access request process.

One advantage of the present invention is that it lends flexibility to the system administrator to control the operation of the system. For example, as the loading of the system is increased, the probability of unstable system behavior also increases. Thus, the probability of unstable system behavior is dependent upon the value of the maximum allowable loading. A system operator control the probability of catastrophic system outage, at the expense of average capacity, in order to satisfy his current criteria by simply changing the maximum allowable loading value.

In addition, should the system operator wish to allow certain remote units to be high priority users which are permitted to transmit outside of the constraints imposed by the transmission rate set point, he may do so without making any changes to the access control process. In such a case, the transmission rate set point of the system is lowered by the natural operation of the process to compensate for these users. For example, the preferred users may access the system at either full rate or at the maximum transmission rate with a transmit probability of 1 at all times, thereby increasing the loading to the system. The invention compensates for that condition by lowering the transmission rate set point of the lower priority units and does so without any knowledge of the high priority user's presence in the system. In addition, the system administrator may control the value of $\Delta_{TP}$ and $\delta_{TP}$ in order to change the character of the operation of the system.

Figure 4:
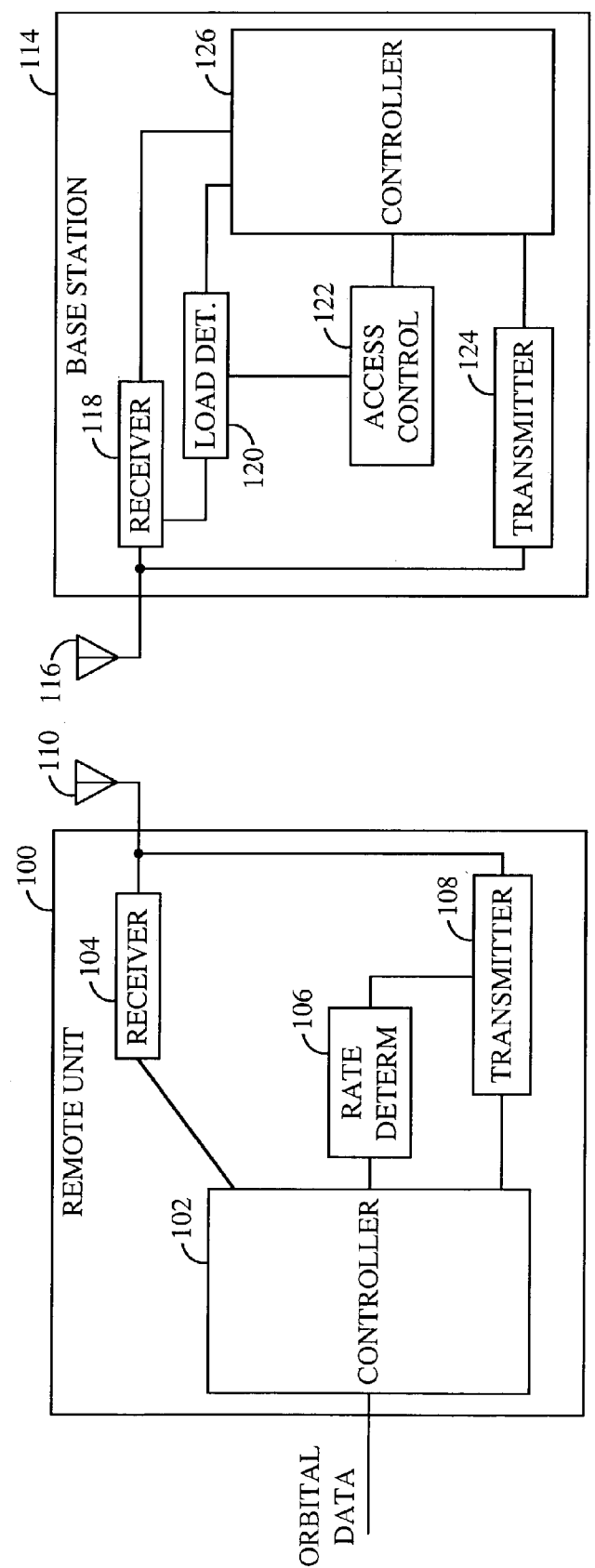
FIG. 4 is a block diagram showing an exemplary wireless system incorporating use of the invention.

FIG. 4 is a block diagram showing an exemplary wireless system incorporating use of the invention. The system is comprised of a base station 114 and a remote unit 100. The base station 114 may be located in close proximity to its corresponding coverage area or some of the components within the base station 114 may be remotely located. The base station 114 receives wireless link signals over an antenna 116. A receiver 118 is used to convert the wireless link signal to a digital bit stream. In addition, the receiver 118 provides an output to a load determination process unit 120 which is used to determine a current loading of the system. The output of the load determination process unit 120 is passed to an access control process unit 122 which provides many of the core functions of the invention. For example, the access control process unit 122 may comprise a plurality of processes which execute the steps exemplified in FIG. 2. The output of the access process unit 122 is the transmission rate set point which is passed to a controller 126. The controller 126 may oversee the general operation of the base station. In one embodiment, the controller 126 incorporates the transmission rate set point into an overhead message and passes it to transmitter 124. The transmitter 124 creates a wireless link signal and passes it to the antenna 116 for transmission over the wireless link to a plurality of remote units including the remote unit 100.

Generally, the remote unit 100 may be or may be coupled to any type of terminal which produces digital information. For example, the remote unit 100 may be or may be coupled to a personal notebook computer, a printer, test equipment, a server, a dumb terminal or a variety of other equipment. The remote unit 100 is comprised of a controller 102 which may oversee the operation of the remote unit 100. In the embodiment shown in FIG. 4, the controller 102 receives digital data from a separately housed unit. The controller also receives data from a receiver 104 created from a wireless link signal received over an antenna 110. The controller 102 extracts the transmission rate set point from the data received from the receiver 104 and passes it to a rate determination process unit 106. The rate determination process unit 106 determines the current transmission rate. For example, the rate determination process unit 106 may have a series of processes which perform the functions shown in FIG. 3. The current transmission rate is used by a transmitter 108 in order to transmit data over the antenna 110 to the base station 114.

A myriad of alternate embodiments consistent with the present invention will be readily discernible to one skilled in the art. For example, referring again to FIG. 2, instead of subtracting 1 from the value of the transmission probability in block 44, the transmission probability may be set to 0 or some small number. Likewise, instead of adding one to the value of the transmission probability in block 60, the transmission probability may be set to 1 or close to unity. In the example shown above, operation included four different data rates. A greater or fewer number of data rates could be used consistently with the invention. Although the description herein has referred to digital data systems, the principles are directly applicable to a number of variable rate systems including voice systems.

In the exemplary embodiment shown above, the values of $\Delta_{TP}$ and $\delta_{TP}$ are dependent upon the maximum transmission rate. In other embodiments they may be fixed throughout operation or they may be dependent upon some other variable. Although use of the overhead channel lends efficiency to the system, the transmission rate set point may be communicated to a remote unit on a dedicated channel consistent with the invention.

The transmission probability can take on one of a variety of forms. In the example above, the transmission probability reflects the probability that the remote unit transmits at the maximum transmission rate. Alternatively, the transmission probability could reflect the probability that the remote unit transmits at the next lower rate below the maximum transmission rate. In order to impose the restriction of the transmission probability, the example above used random number generation. A myriad of other well known and later developed schemes may be used in order to impose the restriction.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method of controlling access to a system comprising the steps of:
receiving a loading indication reflecting a current system usage relative to an upper bound;
increasing a transmission rate set point used to regulate access to said system if said loading indication is less than an allowable limit; and
decreasing said transmission rate set point if said loading indication is greater than said allowable limit wherein said transmission rate set point comprises a maximum transmission rate and a transmission probability,
wherein said step of increasing said transmission rate set point comprises the step of increasing said transmission probability by a first amount,
wherein said step of decreasing said transmission rate set point comprises the step of decreasing said transmission probability by a second amount, wherein said first and second amount is dependent upon said maximum transmission rate.

2. A method of controlling access to a system comprising the steps of:
receiving a loading indication reflecting a current system usage relative to an upper bound;
increasing a transmission rate set point used to regulate access to said system if said loading indication is less than an allowable limit; and
decreasing said transmission rate set point if said loading indication is greater than said allowable limit wherein said transmission rate set point comprises a maximum transmission rate and a transmission probability,
wherein said step of increasing said transmission rate set point comprises the step of increasing said transmission probability by a first amount, wherein said step of decreasing said transmission rate set point comprises the step of decreasing said transmission probability by a second amount, wherein said step of increasing said transmission rate set point comprises the step of increasing said maximum transmission rate if said transmission probability exceeds unity.

3. A method of controlling access to a system comprising the steps of:
receiving a loading indication reflecting a current system usage relative to an upper bound;
increasing a transmission rate set point used to regulate access to said system if said loading indication is less than an allowable limit; and
decreasing said transmission rate set point if said loading indication is greater than said allowable limit wherein said transmission rate set point comprises a maximum transmission rate and a transmission probability,
wherein said step of increasing said transmission rate set point comprises the step of increasing said transmission probability by a first amount,
wherein said step of decreasing said transmission rate set point comprises the step of decreasing said transmission probability by a second amount, wherein said step of decreasing said transmission rate set point comprises the step of decreasing said maximum transmission rate if said transmission probability falls below zero.

4. An access control apparatus comprising:
a receiver adapted to receive signals from a plurality of users capable of transmitting data at more than one rate;
a load determination unit coupled to said receiver and for producing an indication of system loading; and
an access control process unit for receiving said indication of system loading and for producing a transmission rate set point for transmission to said plurality of users,
wherein said access control process unit comprises a process which generates said transmission rate set point by determining a maximum transmission rate and a transmission probability, wherein said access control process unit comprises a process which decreases said transmission probability if said loading exceeds an allowable level and deceases said maximum transmission rate to a next lower rate if said transmission probability falls below zero.

* * * * *